Figure 1:
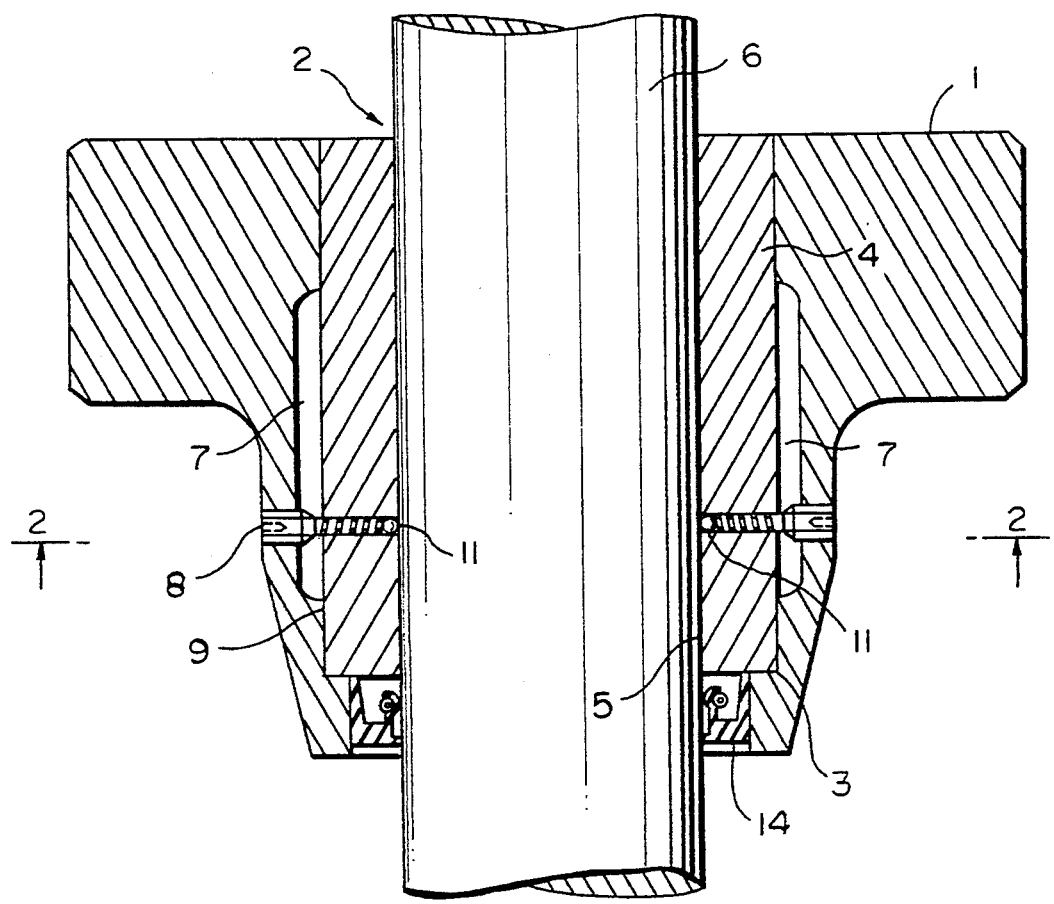

United States Patent [19]
von Sikorski et al.

[11] Patent Number: 5,400,871
[45] Date of Patent: Mar. 28, 1995

[54] SLIDEWAY GUIDE UNIT

[75] Inventors: Rainer von Sikorski, Rosrath; Stevan Kilianovic, Cologne, both of Germany

[73] Assignee: KVS Gesellschaft fur Blechumformung mbH, Overath, Germany

[21] Appl. No.: 185,265

[22] Filed: Jan. 24, 1994

[51] Int. Cl.⁶ .............................................. F16C 7/00
[52] U.S. Cl. .......................................... 184/5; 184/24; 184/80; 184/100; 92/156; 92/168; 92/165 R
[58] Field of Search ..................... 184/5, 24, 25, 100, 184/80, 82; 92/153, 156, 165 R, 168

[56] References Cited

U.S. PATENT DOCUMENTS

| | | | |
|---|---|---|---|
| 4,131 | 9/1870 | Daniels | 184/82 |
| 129,760 | 7/1872 | Smith | 184/80 |
| 145,231 | 12/1873 | Parker | 184/82 |
| 296,390 | 4/1884 | Congdon | 184/80 |
| 814,269 | 3/1906 | Brown | 184/100 |
| 1,347,959 | 7/1920 | McGann | 92/156 |
| 1,510,422 | 9/1924 | Steinbrecher | 92/156 |
| 1,975,951 | 10/1934 | Kearns . | |
| 5,086,691 | 2/1992 | von Hatten | 92/168 |

FOREIGN PATENT DOCUMENTS

| | | | |
|---|---|---|---|
| 849024 | 11/1939 | France | 184/100 |
| 666119 | 9/1938 | Germany | 184/80 |
| 1220361 | 5/1965 | Germany . | |
| 1777233 | 9/1968 | Germany . | |

Primary Examiner—Thomas E. Denion
Attorney, Agent, or Firm—Browdy and Neimark

[57] ABSTRACT

A slideway guide unit for column ways in toolmaking and machine construction comprises a guide unit and a sliding element, secured to it and in contact with a guideway, together with a lubricating device for lubricating the guideway. The invention prevents lubricant losses during assembly and disassembly operations. The sliding element is connected to the guide unit in a positive, impervious and detachable manner, using intermediate sealing elements. The lubricating device displays at least one integrally molded, annular lubricant chamber in the region of the outer wall of the sliding element. At least one of the lubricant chambers is provided with an inlet and each of the lubricant chambers has at least one self-closing outlet for a lubricant, and the outlets penetrate the sliding element and end on the guideway.

20 Claims, 4 Drawing Sheets

SLIDEWAY GUIDE UNIT

The invention relates to a slideway guide unit for column ways or flat ways in toolmaking and machine construction, comprising a guide unit and a sliding element, secured to it and in contact with a guideway, together with a lubricating device for lubricating the guideway.

Known guide units for longitudinal ways are provided with a sliding element designed as a wearing part, which can be made of bronze, steel or grey cast iron and slides on the guideway. In the case of column ways, the sliding element is designed as a bush and secured within the guide unit to accommodate and guide the column. In order to reduce the friction between the guideway or column and the sliding element, it is customary to feed liquid lubricants or greases via a lubricating nipple by means of a pump or grease gun. This makes it difficult to meter the lubricants accurately, and lubricant losses have to be expected during assembly or disassembly operations.

Another possibility is the use of solid lubricants, such as graphite or molybdenum sulphide, which can be incorporated either into pores in the sliding element or into additional drilled holes distributed over its inner surface. However, this is only possible before installation of the sliding elements. When the elements move relative to one another, graphite particles are torn out of the pores or holes and distributed over the guideway. The lubricating effect attainable in the long term is limited, as the pores can easily become clogged as a result of abrasion.

Renewal of the solid lubricants is only possible by removing and/or replacing the sliding element, and is thus complicated and expensive. Furthermore, the use of drilled holes to accommodate the solid lubricants entails high manufacturing costs because of the large number of holes required. In the case of column ways, this additionally reduces the resistance of the guide unit to lateral impact.

The task of the invention is thus to create a slideway guide unit for column or flat ways in toolmaking or machine construction, which is capable of achieving improved guideway lubrication by means of a lubricating device which is easy to manufacture, to service and, in particular, to install, and which reliably prevents lubricant losses during assembly and disassembly operations.

Based on a slideway guide unit of the type mentioned at the beginning, the task on which the invention is based is solved in that the sliding element is connected to the guide unit in a positive, impervious and detachable manner, using intermediate sealing elements, in that the lubricating device displays at least one integrally moulded, annular lubricant chamber in the region of the outer wall of the sliding element, in that at least one of the lubricant chambers is provided with an inlet and each of the lubricant chambers with at least one self-closing outlet for a lubricant, and in that the outlets penetrate the sliding element and end on the guideway.

This lubricating device is particularly easy to manufacture and service and, given particularly uniform lubricant distribution on the guideways, ensures their good and permanent lubrication. Consequently, this lubricating device affords a particularly long service life. In addition, lubricant losses and the associated environmental pollution are reliably prevented during assembly and disassembly operations. A further advantage of the invention is that it displays a high mechanical load-bearing capacity.

A further improvement in the invention is achieved by providing several interconnected lubricant chambers which axially surround the sliding element at intervals.

One particularly advantageous embodiment of the invention is characterised by the fact that each of the lubricant chambers is provided with three, evenly distributed outlets and that the outlets of adjacent lubricant chambers are offset at an angle of 60° in each case. This achieves particularly good and even distribution of the lubricant with the smallest possible number of outlets.

If the inlet is connected in each case to the uppermost lubricant chamber in the installed position, the lubricant chambers can be filled particularly easily and without pressure, especially if lubricating oils of very low viscosity are used.

In order to allow permanent monitoring of the lubricant level in the lubricant chambers, it is advantageous if the uppermost lubricant chamber in each case is additionally provided with an inspection port, sealed off from the outside by a sight glass.

In a further development of the invention, the outlet displays a closure which opens the outlet when subjected to pressure. To this end, it is expedient for the outlet to have a cylindrical cross-section which is tapered towards the guideway, said tapered section of the outlet accommodating a sliding sealing element which, when not subject to pressure, partially protrudes from the sliding element in such a way that the lubricant in the lubricant chambers is reliably held back.

It is advantageous to design the sealing element as a spring-loaded ball and to press this ball against the tapered section of the outlet by means of a compression spring. A sealing element of this kind is very easy to manufacture and ensures a particularly good sealing effect.

With this sealing element, part of the ball thus protrudes from the sliding element and is forced back when the guideway comes into contact with the sliding element, thus opening the outlet and clearing the lubricant supply line.

In order substantially to facilitate assembly of the guide unit, the end of the outlet opposite to the ball is sealed with a cap.

In one version of the invention, the outlet is provided with a solenoid valve. This version allows the outlet to be opened and closed by remote control.

In another development of the invention, the guideway is designed as a column which is surrounded in sliding fashion by the guide unit and the sliding element fixed inside it. In this case, the sliding element advantageously takes the form of a bush, with the result that the bush can be manufactured as a turned part at particularly low cost.

A further embodiment of the invention is characterised by the fact that two sealing rings, arranged axially at a distance from each other and enclosing the lubricant chambers, are recessed into the outer side of the bush. This means that it is not necessary to secure the bush in the guide unit in a non-positive fashion, but that a positive fit will suffice because the escape of lubricant is reliably prevented by the sealing rings. The bush need merely be fitted so tightly that the forces occurring between bush and guide unit are reliably transmitted.

The lubricant chambers can be recessed either into the inner wall of the guide unit, or into the outer wall of the bush.

The invention is furthermore characterised by the fact that the closure of each outlet releases the lubricant when radial pressure is applied during insertion of the column.

The invention makes it possible to fill the lubricant chambers with a lubricant without losses occurring, both in assembled and disassembled condition of the guide unit, i.e. when the column has been removed. This is achieved by the automatic outlet closure, which operates immediately when the guide unit is separated from the guideway or the column is withdrawn from the bush.

In order to prevent entrainment of lubricant as a result of the movement of the column within the guide unit, it is also advantageous to fit a shaft seal, concentrically surrounding the column, into the guide unit at one end of the bush at least.

Figure 2:
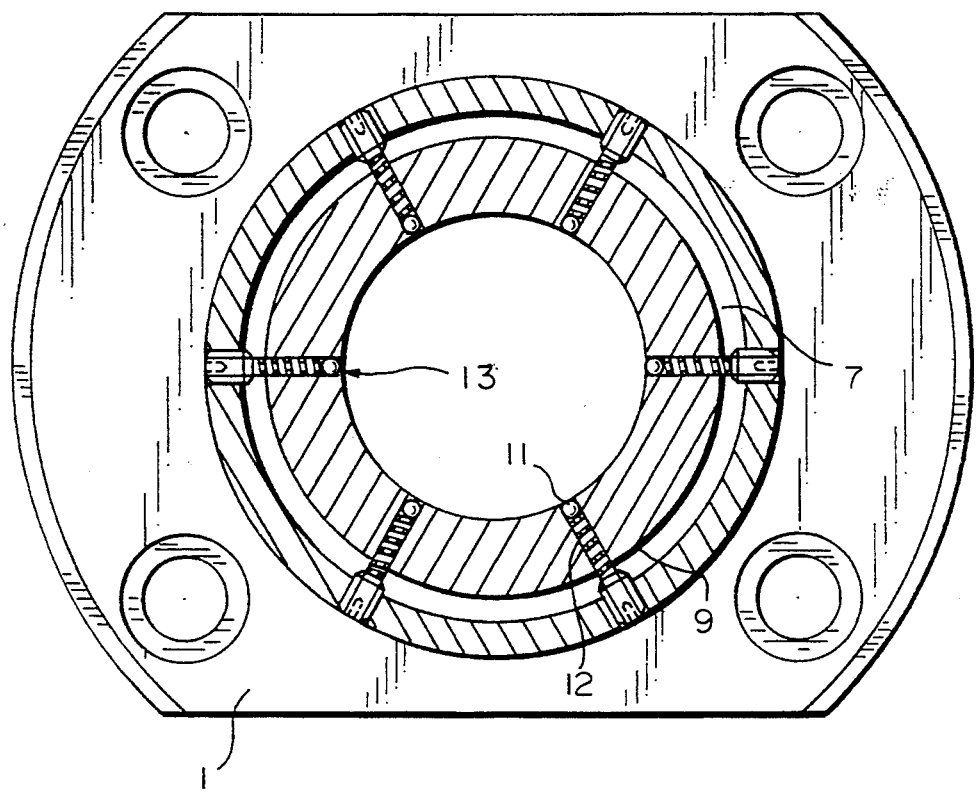
Figure 3:
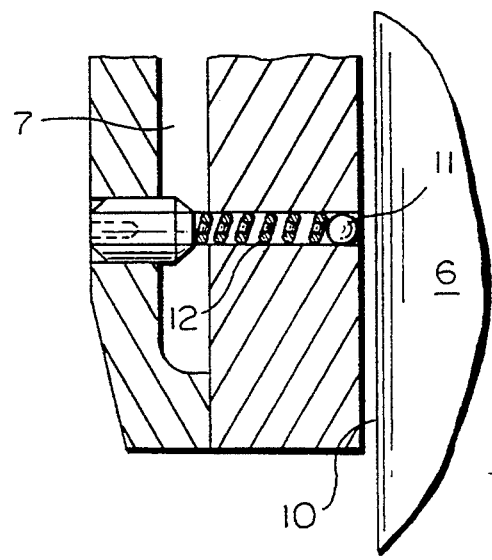
Figure 4:
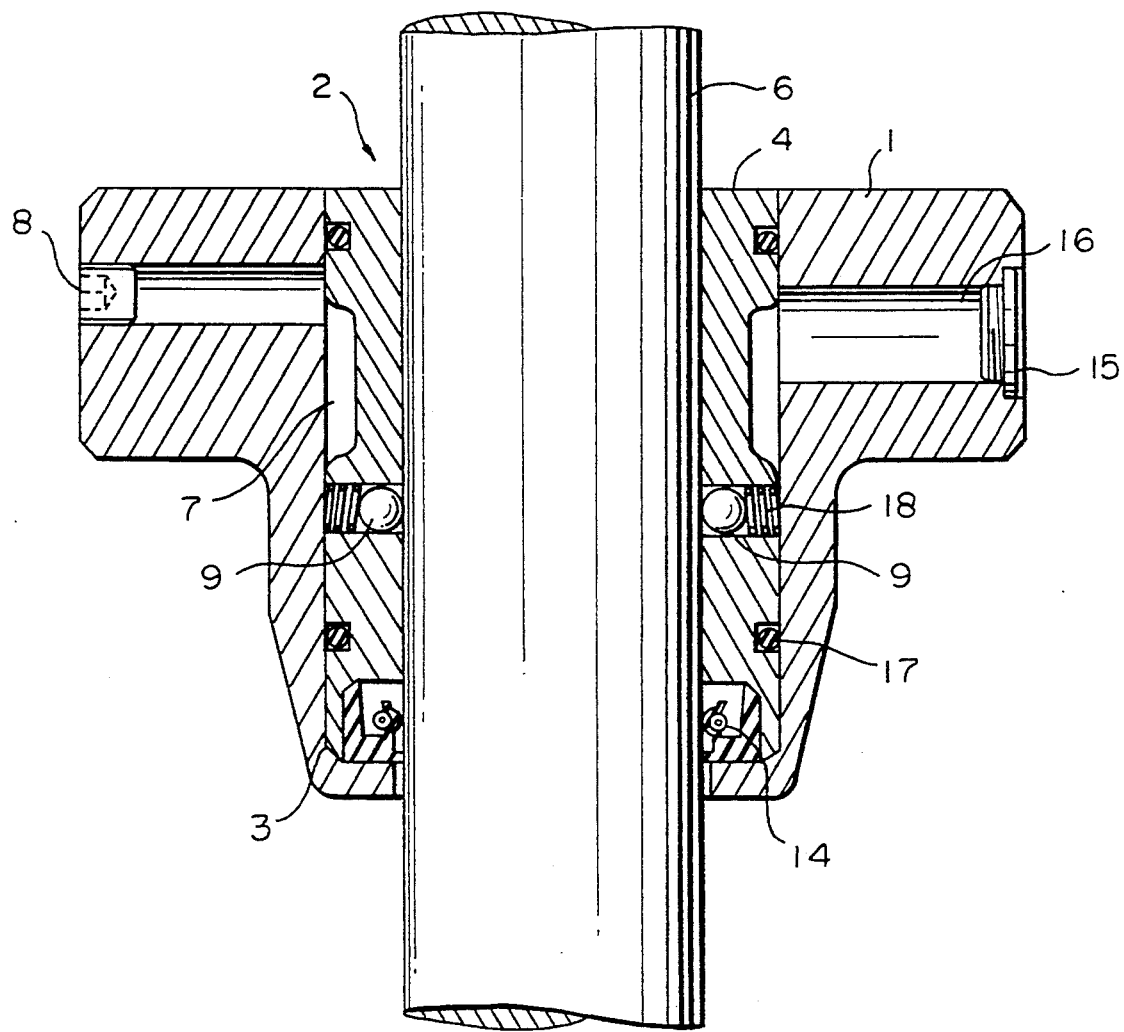
Figure 5:
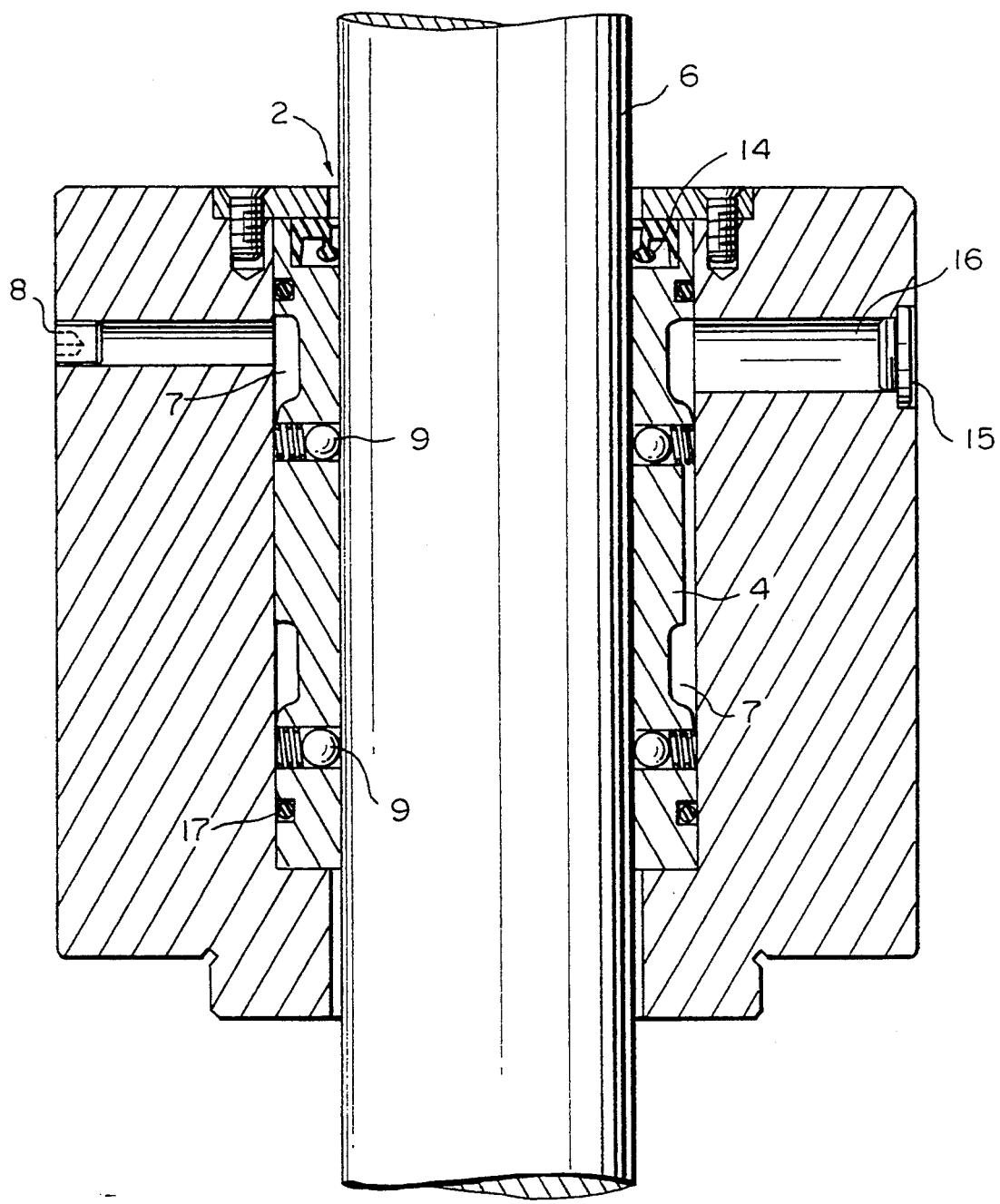

The invention is described in more detail below on the basis of a practical example. The associated drawings show the following:

FIG. 1 A longitudinal section through a slideway guide unit with one lubricant chamber, FIG. 2 A cross-section as per FIG. 1 with the outlets closed, FIG. 3 An enlarged section as per FIG. 1 with the outlets open, FIG. 4 A longitudinal section through a slideway guide unit with removable bush, and FIG. 5 A longitudinal section through a slideway guide unit with several lubricant chambers and removable bush.

As can be seen from FIG. 1, the slideway guide unit comprises a symmetrical guide unit 1 with centrally located, full-length longitudinal bore 2, which is provided with a cylindrical extension 3, extending over the greater part of the longitudinal bore 2 to accommodate a bush 4. The dimensions of the extension 3 and the bush 4 should be selected such that the bush 4 is retained firmly in extension 3 when inserted. The inner surface of bush 4 serves to guide a column 6 which can be slid into the bush 4. The extension 3 is furthermore provided with a lubricant chamber 7, which concentrically surrounds the outer surface of the bush 4 and can be filled with a lubricant, preferably a lubricating fluid, through an inlet 8, which runs from the lubricant chamber 7 through the guide unit to the outside. It is, of course, also possible to integrate the lubricant chamber 7 into the outer surface of the bush 4. The lubricant chamber 7 can also be integrated into the outer surface of bush 4 in such a way that it surrounds the bush 4 in spiral fashion.

In this context, the inlet 8 can be provided with a conventional lubricant, a screw fitting or a valve, in order to prevent the lubricating fluid from escaping after filling the lubricant chamber 8.

Feeding of the lubricating fluid between the inner surface 5 of the bush 4 and the outer surface of the column 6 is accomplished via at least one outlet 9, passing through the bush 4.

The lubricant chamber 7 can, of course, also be integrated into the inner surface of the guide unit 1, in which case inlet 8 and outlet 9 are positioned in a similar manner.

The outlet 9 has a cylindrical cross-section and is tapered towards the guideway 10, which is formed by the outer surface of the column 6 (FIG. 3). Located inside the outlet 9 is a sealing element, preferably a ball 11, which is pressed by a compression spring 12 against the tapered end of the outlet, where there is an opening 13 with a diameter smaller than the diameter of the ball 11. As a result, when the guide unit 1 is in the disassembled condition, the ball 11 projects slightly beyond the inner surface 5 of the bush 4, meaning that the outlet 9 is reliably sealed.

When the column 6 is inserted into the bush 4, the ball 11 is forced back and lubricant can be fed via the outlet 9. On the other hand, the outlet 9 is closed immediately when the column 6 is withdrawn. This means that lubricant losses can be reliably prevented.

In order to obtain rapid and even distribution of the lubricating fluid, it is advantageous, as illustrated in FIG. 2, to use an arrangement of six outlets 9, evenly distributed in one plane. However, it has been found that particularly good distribution of the lubricant between the column 6 and the bush 4 is obtained if, as illustrated in FIG. 5, two lubricant chambers 7 are arranged at a distance from each other and each lubricant chamber 7 is provided with only three outlets 9, arranged in such a way that the outlets 9 of one plane are offset through 60° relative to the outlets 9 of the other plane. If, in the case of relatively long guide units 1, or on guide units 1 with a relatively large diameter, there is a need for more than two lubricant chambers 7, the corresponding outlets 9 of one plane must be arranged with a corresponding offset relative to the next plane. As this embodiment requires only a comparatively small number of outlets 9 and thus involves only an insubstantial reduction of the load-bearing surface of the bush 4, the guide unit 1 can be subjected to particularly high mechanical loads without restricting its service life.

However, any other number of outlets 9 may, of course, also be selected. If a spiral-shaped arrangement is selected for the lubricant chamber 7, the outlets 9 would also have to be distributed in a spiral-shaped arrangement.

Located below the bush 4 is a shaft seal 14 (FIGS. 1, 4), which is fixed in the guide unit 1 and concentrically surrounds the column 6. This avoids entrainment of the lubricating fluid during longitudinal movement of the column 6 inside the guide unit 1. Of course, the shaft seal can also be fitted above the guide unit 1 (FIG. 5) or on both sides, thus sealing both ends of the guide unit 1.

One particularly preferred version of the invention can be seen in FIG. 4. This version is based on the slideway guide unit described above, but has distinct improvements which substantially improve its function and handling.

In this case, the lubricant chamber 7 is integrated into the outer surface of the bush 4. This means that the extension 3 in the guide unit 1 can be designed as a simple, smooth-walled bore, this greatly facilitating manufacture of both the bush 4 and the extension 3. Furthermore, a groove for accommodating a sealing ring 17 is integrated in the region of each end of the bush 4, so that the lubricant chamber 7 is enclosed by these and tightly sealed once the bush 4 has been inserted into the extension 3. As a result, the high mating accuracy otherwise required for sealing can be reduced without impairing the function of the guide unit 1. This brings about a further reduction in the production effort. Furthermore, this version also allows easy replacement of the bush 4, should it ever wear on some occasion or be broken. This simply requires the incorporation of two threaded bores opposite to each other in one of the freely accessible face ends of the bush 4, so that an extractor can be attached.

In addition, outlets 9 are provided, which penetrate the bush 4 radially and connect the lubricant chamber 7 to the inner surface 5. In order to achieve better metering of the lubricant supply, the outlets 9 are not directly connected to the lubricant chamber 7, but emerge a short distance below it in the outer surface of the bush 4. For the lubricant to be fed, it can either pass directly through the interface between the extension 3 and the outer surface of the bush 4, or connecting ducts or recesses in the outer surface of the bush 4 are incorporated between the lubricant chamber 7 and the outlets 9. The amount of lubricant to be fed to the outlets 9 can be defined by appropriate selection of the cross-section of these connecting ducts.

In the modification illustrated in FIG. 5, two lubricant chambers 7 are incorporated in the outer surface of the bush 4 at a distance from one another and one above the other; in this context, it is also possible to provide more than two lubricant chambers 7, particularly in the case of relatively long guide units 1 or guide units 1 subject to particularly great loads. These lubricant chambers 7 are interconnected, this being achieved by the bush 4 being fitted positively and non-positively in the extension 3, with the middle section of the bush 4 between the lubricant chambers 7 having a smaller diameter than the upper and lower load-bearing sections of the bush 4.

Another possibility for interconnecting the lubricant chambers 7 is to integrate connecting ducts or grooves between the lubricant chambers 7 into the outer surface of the bush.4. In this case, it suffices to provide just one of the lubricant chambers 7, preferably the uppermost lubricant chamber in each case, with an inlet 8. The outlets 9 and their closures can, as already described, be arranged in the manner illustrated in FIGS. 2 and 3.

Here, the bush 4 is again sealed off from the guide unit 1 by means of sealing rings 17, which are inserted in corresponding grooves above and below the lubricant chambers 7. As a result, it is not absolutely necessary to select the dimensions of the extension 3 and the bush 4 in such a way that a highly accurate fit is achieved when inserting the bush 4. However, the fit must be sufficiently good to ensure reliable transmission of the forces occurring to the column 6, in the case of a moving guide unit 1, or to the guide unit 1, in the case of a moving column 6.

To allow permanent monitoring of the filling level of the lubricant chambers 7, the uppermost lubricant chamber 7 in each case is additionally provided with an inspection port 16, sealed off from the outside by a sight glass 15 (FIGS. 4, 5).

A further advantage of the invention lies in the fact that its design allows the use of any desired material pairs. For example, it is easily possible to use suitable plastic materials, or even steel, for the bush 4, instead of bronze.

In order also to facilitate assembly of the guide unit, the end of the outlets 9 opposite to the ball 11 are sealed by a cap 18, which is provided with a hole as the lubricant inlet and serves as the abutment for the compression spring 12 located in the outlet. The cap 18 is captively secured in the outlet 9, for instance by pressing-in, although other methods of securing can, of course, be considered and must be selected in accordance with the material used for the bush. For instance, the cap can also be secured by soldering or bonding.

The invention can also be used in an appropriate manner for any form of flat ways, by designing the guide unit 1 as a flat guide unit to which a sliding element is secured, for instance with intermediate sealing elements. In this case, the lubricant chambers 7 have to be located between the sliding element and the flat guide unit.

As a result, the invention and all its advantages can be used for any column or flat ways in toolmaking and machine construction.

We claim:

1. Slideway guide unit for column ways in toolmaking and machine construction, comprising a guide unit and a sliding element in contact with the guideway which is connected to the guide unit in a positive, impervious and detachable manner and a lubricating device, consisting of a lubricating chamber to lubricate the guideway, whereby the lubricating chamber displays inlets and self-closing outlets, which penetrates the guiding element and end on the guideway, characterized in that several interconnected annular lubricant chambers (7) are integrated into the outer surface of the sliding element between the sliding element and the guide unit (1) with an axially distance to one another, that each of the lubricant chambers (7) is connected to several at evenly distributed outlets (9) and that the outlets (9) of each of the lubricant chambers (7) are arranged in a plane.

2. Slideway guide unit as per claim 1, characterized in that each of the lubricant chambers (7) is provided with three evenly distributed outlets (9) and in that the outlets (9) of adjacent lubricant chambers (7) are offset to the neighboring outlets (9) at an angle of 60° in each case.

3. Slideway guide unit as per claim 1, characterized in that 35 the inlet (8) is in each case connected to the uppermost lubricant chamber (7) in the installed position.

4. Slideway guide unit as per claim 1, characterized in that the guideway (10) is designed as a column (6) which is surrounded in sliding fashion by the guide unit (1) and the sliding element fixed inside it.

5. Slideway guide unit as per claim 1, characterized in that the sliding element takes the form of a bush (4).

6. Slideway guide unit as per claim 5, characterized in that the lubricant chamber is integrated into the outer surface of a bush (4) and that an extension (3) in the guide unit (1) is designed as a simple, smooth walled bore.

7. Slideway guide unit as per claim 5, characterized in that the outlets (9) ends a short distance below the lubricant chambers (7) and that between the lubricant chambers (7) and the outlets (9) are designed connecting ducts or recesses in the outer surface of a bush (4).

8. Slideway guide unit as per claim 5, characterized in that a middle section of the bush (4) between the lubricant chambers (7) having a smaller diameter than upper and lower load-bearing sections of the bush (4).

9. Slideway guide unit as per claim 5, characterized in that between the lubricant chambers (7) are integrated connecting ducts or grooves into the outer surface of the bush (4).

10. Slideway guide unit as per claim 5, characterized in that two sealing rings (17) are inserted at a distance to one another in the outer surface of the bush (4) and that the sealing rings (17) enclose the lubricant chambers (7).

11. Lubricating slideway apparatus for slidably supporting an elongate machine element (6), the apparatus comprising:
- a bearing element (4) having a slideway surface for supporting the machine element;
- a guide unit (1) in contact with the bearing element, said bearing element connected to said guide unit in a positive, impervious, and detachable manner;
- an interconnected plurality of lubricating chambers (7), each one of said plurality of lubricating chambers integrated into an outer surface of the bearing element, the outer surface proximal the guide unit and distal the slideway surface;
- an inlet (8) communicating with said plurality of lubricating chambers;
- a plurality of self-closing outlets (9) disposed on the slideway surface and communicating with a one of said plurality of lubricating chambers;
- each one of said plurality of lubricating chambers communicating with a respective subset of said plurality of self-closing outlets, the outlets of a subset evenly distributed and disposed in a plane.

12. The slideway apparatus according to claim 11, wherein:
- the machine element is cylindrical;
- said plurality of lubricating chambers are axially spaced; and
- each one of said chambers is provided with the respective subset further comprising three of the plurality of outlets, the three evenly distributed about an axis of the machine element; and the outlets of adjacent lubricant chambers are offset to the neighboring outlets at an angle of 60 degrees in each case.

13. The slideway apparatus according to claim 11, wherein said inlet communicates with an uppermost one of said plurality of lubricating chambers when said slideway apparatus in an installed position.

14. The slideway apparatus according to claim 11, wherein the slideway is cylindrical and is surrounded by said bearing element, said bearing element slidably fixed inside said guide unit.

15. The slideway apparatus according to claim 11, wherein said bearing element further comprises a bushing (4).

16. The slideway apparatus according to claim 15, wherein said plurality of lubricating chambers are integrated into the outer surface of the bushing, and wherein said guide unit further comprises a smooth-walled cylindrical bore.

17. The slideway apparatus according to claim 15, further comprising connecting ducts between each one of said plurality of self-closing outlets and said plurality of lubricating chambers, the connecting ducts opening to the outer surface of the bushing.

18. The slideway apparatus according to claim 15, wherein a middle section of the bushing is disposed between an upper load-bearing section of the bushing and a lower load-bearing section of the bushing and said middle section includes an outer diameter smaller than upper and lower section diameters.

19. The slideway apparatus according to claim 15, further comprising communicating passages, said passages being selectively grooves in the outer surface of the bushing and ducts, said passages interconnecting said plurality of lubricating chambers.

20. The slideway apparatus according to claim 15, including two sealing rings (17) disposed at a distance on the outer surface of the bushing such that the sealing rings sealingly enclose the plurality of lubricant chambers.

* * * * *